(12) United States Patent
Nguyen

(10) Patent No.: US 9,708,527 B2
(45) Date of Patent: Jul. 18, 2017

(54) PARTICULATES HAVING HYDROPHOBIC AND OLEOPHOBIC SURFACES AND METHODS RELATING THERETO

(75) Inventor: Philip D. Nguyen, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 740 days.

(21) Appl. No.: 13/463,311

(22) Filed: May 3, 2012

(65) Prior Publication Data

US 2013/0292118 A1 Nov. 7, 2013

(51) Int. Cl.
| | |
|---|---|
| C09K 8/03 | (2006.01) |
| C09K 8/26 | (2006.01) |
| C09K 8/62 | (2006.01) |
| C09K 8/80 | (2006.01) |

(52) U.S. Cl.
CPC .............. C09K 8/62 (2013.01); C09K 8/805 (2013.01)

(58) Field of Classification Search
CPC .............. C09K 8/03; C09K 8/26; C09K 8/32
USPC ...................................... 166/280.1
See application file for complete search history.

(56) References Cited

U.S. PATENT DOCUMENTS

| | | | |
|---|---|---|---|
| 4,460,627 A | 7/1984 | Weaver et al. | |
| 4,532,052 A | 7/1985 | Weaver et al. | |
| 5,905,061 A | 5/1999 | Patel | |
| 5,977,031 A | 11/1999 | Patel | |
| 6,828,279 B2 | 12/2004 | Patel et al. | |
| 7,534,745 B2 | 5/2009 | Taylor et al. | |
| 7,645,723 B2 | 1/2010 | Kirsner et al. | |
| 7,696,131 B2 | 4/2010 | Oyler et al. | |
| 2002/0192385 A1 | 12/2002 | Jenkner et al. | |
| 2003/0207629 A1 | 11/2003 | Sobieski et al. | |
| 2008/0090088 A1 | 4/2008 | Deruelle et al. | |
| 2010/0018706 A1* | 1/2010 | Fan et al. ....................... | 166/271 |
| 2010/0167965 A1* | 7/2010 | Sebastian et al. ............ | 507/230 |
| 2010/0276142 A1* | 11/2010 | Skildum ............ | C08G 18/2885 166/280.2 |
| 2011/0250422 A1 | 10/2011 | Kessman et al. | |
| 2012/0073817 A1* | 3/2012 | van Zanten .............. | C09K 8/26 166/305.1 |
| 2013/0081812 A1* | 4/2013 | Green et al. ............... | 166/280.1 |
| 2013/0306314 A1 | 11/2013 | Curtice | |

FOREIGN PATENT DOCUMENTS

| | | |
|---|---|---|
| DE | 3911684 A1 | 11/1989 |
| GB | 2031482 A | 4/1980 |
| WO | 2008070704 | 6/2008 |
| WO | 2013166128 A1 | 11/2013 |

OTHER PUBLICATIONS

International Search Report and Written Opinion for PCT/US2013/039037 dated Jul. 19, 2013.

* cited by examiner

*Primary Examiner* — Doug Hutton, Jr.
*Assistant Examiner* — Ashish Varma
(74) *Attorney, Agent, or Firm* — McDermott Will & Emery LLP

(57) ABSTRACT

Generally, hydrophobic/oleophobic proppant particles may have hydrophobic and oleophobic surfaces. Hydrophobic/oleophobic proppant particles may be utilized for treating at least a portion of a subterranean formation with a treatment fluid comprising a base fluid and the hydrophobic/oleophobic proppant particle. Treatments may involve the formation of proppant packs, gravel packs, and the like.

14 Claims, No Drawings

PARTICULATES HAVING HYDROPHOBIC AND OLEOPHOBIC SURFACES AND METHODS RELATING THERETO

BACKGROUND

The present invention relates to particulates having hydrophobic and oleophobic surfaces and subterranean operations relating thereto.

After a wellbore is drilled, it may often be necessary to fracture the subterranean formation to enhance hydrocarbon production, especially in tight formations like shales and tight-gas sands. Access to the subterranean formation can be achieved by first creating an access conduit from the wellbore to the subterranean formation. Then, a fracturing fluid, often called a pre-pad, is introduced at pressures exceeding those required to maintain matrix flow in the formation permeability so as to create or enhance at least one fracture that propagates from at least one access conduit. The pre-pad fluid is followed by a pad fluid comprising proppant particles that often accumulate into proppant packs. Generally, proppant packs hold open the fracture after pressure from the fluid is reduced, thereby maintaining the ability for fluid to flow through the fracture and ultimately be produced at the surface.

In some instances, proppant particles are coated with polymers or surfactants to render the surface of the proppant particle hydrophilic. Generally, it is believed that hydrophilic surfaces may act to absorb water and allow hydrocarbons to pass, thereby minimizing the production of water at the wellbore. However, in some cases, the absorption of water to hydrophilic proppant particles can cause pressure to build up in the proppant packs and reduce the overall conductivity of any fluid through the proppant pack. In the long-term (e.g., months to years), loss of conductivity can result in reduced hydrocarbon production and, possibly, the need for remedial subterranean operation to return proppant pack conductivity. Reduced hydrocarbon production can cost time and be expensive, especially where additional remedial operations are needed.

Additionally, in the short-term (e.g., days to months), reduced conductivity through proppant packs may inhibit the flow back operations. As used herein, the term "flow back" refers to the process of allowing fluids to flow from the wellbore or near-wellbore portion of the subterranean formation to the surface following a treatment operation. Flow back processes are generally used between treatments so as to remove a previous treatment fluid or in preparation for cleanup so as to prepare the wellbore for production. Flow back processes can be particularly important when the fluids of subsequent treatment operations are incompatible, e.g., a brine treatment fluid followed by a foamed treatment fluid that is salt sensitive. Consequently, where a treatment fluid is still associated with a proppant pack, a subsequent treatment fluid may, in some instances, be ineffective in at least that portion of the subterranean formation, thereby reducing the efficacy of the subsequent treatment operation.

Therefore, the ability to efficiently and over long periods of time allow for the conductivity of water and hydrocarbons through proppant pack may be of benefit to one of ordinary skill in the art.

SUMMARY OF THE INVENTION

The present invention relates to particulates having hydrophobic and oleophobic surfaces and subterranean operations relating thereto.

In some embodiments, the present invention provides a method comprising: treating at least a portion of a subterranean formation with a treatment fluid comprising a base fluid; and a hydrophobic/oleophobic proppant particle having a surface that is both hydrophobic and oleophobic.

In other embodiments, the present invention provides a method comprising: introducing a pad fluid into at least a portion of a subterranean formation at a pressure sufficient to create or extend at least one fracture in the subterranean formation; and introducing a proppant slurry fluid into the subterranean formation, the proppant slurry fluid comprising a base fluid and a hydrophobic/oleophobic proppant particle.

In still other embodiments, the present invention provides a method comprising: treating a proppant at a well site so as to yield a hydrophobic/oleophobic proppant particle having a surface that is both hydrophobic and oleophobic; and introducing the hydrophobic/oleophobic proppant particle into at least a portion of a subterranean formation.

In some embodiments, the present invention provides a treatment fluid comprising: a base fluid; and a hydrophobic/oleophobic proppant particle having a surface that is both hydrophobic and oleophobic.

In other embodiments, the present invention provides a hydrophobic/oleophobic proppant particle comprising: a proppant particle having a surface that is both hydrophobic and oleophobic.

The features and advantages of the present invention will be readily apparent to those skilled in the art upon a reading of the description of the preferred embodiments that follows.

DETAILED DESCRIPTION

The present invention relates to particulates having hydrophobic and oleophobic surfaces and subterranean operations relating thereto.

Some embodiments of the present invention provide for hydrophobic/oleophobic proppant particles. As used herein, the term "hydrophobic/oleophobic proppant particle" refers to a proppant particle having a surface that is both hydrophobic and oleophobic. Further, some embodiments provide for methods and compositions relating to the application of hydrophobic/oleophobic proppant particles in subterranean formations, especially relating to proppant packs. As used herein, "proppant particles" and "proppants" may be used interchangeably and refer to any material or formulation that can be used to hold open at least a portion of a fracture. As used herein, a "proppant pack" is the collection of proppant particles in a fracture. It should be understood that the term "particulate" or "particle," and derivatives thereof as used in this disclosure, includes all known shapes of materials, including substantially spherical materials, low to high aspect ratio materials, fibrous materials, polygonal materials (such as cubic materials), and mixtures thereof.

Without being limited by theory with regards to subterranean operations, it is believed that a surface that is both hydrophobic and oleophobic may advantageously reduce the drag forces of the water and the hydrocarbons when passing over a surface that is both hydrophobic and oleophobic. Reduced drag forces may consequently minimize fluid absorption to the surface of proppant particles, yield higher conductivity of fluids through a proppant pack, and enhance flow rates of fluid through a proppant pack, e.g., hydrocarbon fluid in production wells and water in injection wells. Higher conductivity, reduced fluid absorption, and higher flow rates may mitigate pressure buildup within a proppant pack over the long-term and may enhance flow back processes over the short-term. Consequently, the rig time and potential for remedial treatments may be greatly reduced, which has significant cost savings.

Conversely, utilizing hydrophobic/oleophobic proppant particles in conjunction with injection wells may advantageous enhance the flow of fluids into a subterranean formation, for at least the reasons described above, which may consequently yield higher production at a corresponding production wellbore.

It should be noted that when "about" is provided at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

The hydrophobic/oleophobic proppant particles of the present invention have a surface that is both hydrophobic and oleophobic. In some embodiments, hydrophobic/oleophobic proppant particles of the present invention may be at least partially coated so as to yield a surface that is both hydrophobic and oleophobic. As used herein, the terms "coat" or "coating," and the like, does not imply any particular degree of surface coverage. In particular, the terms "coat" or "coating" do not imply 100% surface coverage. Further, the terms "coat" or "coating" do not imply the nature of the coating interactions with a surface. That is, coatings may be chemically bound, adsorbed, and the like, or any combination thereof.

Forming coatings on proppant particles to yield hydrophobic/oleophobic proppant particles of the present invention may involve at least one of (1) adsorbing polymers to a surface, (2) polymerizing monomers adsorbed to a surface, (3) chemically functionalizing a surface, or (4) any combination thereof. Further, forming coatings may involve pretreating a surface (e.g., with an adhesion-promoting compound or by exposing the surface to corona discharge, flaming, glow discharge, irradiation with electromagnetic waves, plasma discharge, or any combination thereof). Additionally, forming coatings may involve heating and/or cooling (e.g., flash heating, flash freezing, drying, sintering, infusing, curing, and the like) before, during, or after a coating process. By way of nonlimiting example, a coating may be formed by first retreating a proppant particle with a plasma discharge, then chemically functionalizing the surface, and finally polymerizing monomers so as to form a coating on at least a portion of the surface of the proppant particle that is chemically bound to the surface.

Adsorbing a polymer and/or a monomer to a surface of a proppant particle may be achieved while the proppant particle is dispersed in a liquid or as a dry powder. Adsorption to a surface of a proppant particle may involve metering, pouring, spraying, electrospray, blowing, plasma depositing, or vacuum depositing a polymer and/or a monomer while the proppant particle is being blended, mixed, altered, agitated, immersed, fluidized, or any combination thereof. Further, a polymer and/or monomer may be in the form of a resin, a powder, a particle, a melt, and the like. By way of nonlimiting example, a proppant particle that is conductive (e.g., bauxite) or has a conductive coating (e.g., polypyrrole) may be coated with electrostatic paint comprising a suitable polymer and/or monomer. By way of another nonlimiting example, a proppant particle may be treated with the plasma of organic molecules that polymerize on the surface of the proppant particle. Generation of polymeric coatings via plasma of organic molecules may advantageously create complex polymer networks that have greater heat and chemical stability.

Suitable polymers for use in conjunction with the present invention may include, but are not limited to, crosslinked polyoranosiloxane, fluorinated polymers, partially-fluorinated polymers, fluoroalkyl-functional organopolysiloxanes, poly(perfluoroalkylethyl methacrylate), polytetrafluoroethylene, polyvinylidene fluoride, polyfluoroacrylate, fluorinated oxetane co- or tere-polymers, fluorinated resins, polyvinylfluoride, fluoroalkyl-polyurethane copolymer, and any combination thereof.

Suitable monomers for use in conjunction with the present invention may include, but are not limited to, fluoro-monomers (e.g., a fluoroalkyl monomer, a perfluoroalkyl monomer, a vinyl fluoroalkyl monomer, a vinyl perfluoroalkyl monomer, a fluoroalkyl methacrylate monomer, a methacrylate perfluoroalkyl monomer, a fluoroalkyl acrylate monomer, a perfluoroalkyl acrylate monomer, a fluoroalkyl epoxy monomer, a perfluoroalkyl epoxy monomer, a fluoroalkyl urethane monomer, a perfluoroalkyl urethane monomer, a fluoroalkyl-containing monomeric alkoxylsilane, a fluoroalkyl-containing monomeric silanol, a fluoroalkyl-containing monomeric siloxane, perfluoroalkylethyl methacrylate, vinyl fluoride, vinylidene fluoride, tetrafluoroethylene, perfluoropropylvinylether, chlorotrifluoroethylene, and monosubstituted oxetane monomers having fluorinated alkoxymethylene side-chains, where alkyl groups may range from about $C_3$ to about $C_{12}$) optionally in conjunction with non-fluoro-monomers (e.g., ethylene, propylene, acrylate, methacrylate, silanes, organosilanes, siloxanes, and organosiloxanes) and the like, or any combination thereof. In some embodiments, two or more fluoro-monomers may be used in forming a coating. By way of nonlimiting example, a vinyl trifluoromethyl monomer may be used in conjunction with a vinyl perfluoroalkyl monomer having an alkyl group of about $C_3$ to about $C_{12}$, which may be polymerized via free-radical or radiation-induced polymerization.

In some embodiments, reactions to form polymer coatings in situ (e.g., polymerization of monomers adsorbed to a proppant surface) may involve monomers, surfactants, initiators, and the like, or any combination thereof. Suitable surfactants for use in conjunction with the present invention may include, but are not limited to, sodium dodecyl sulfate, linear alkenylbenzyl sulfonate, dodecylbenzenesulfonic acid, or any combination thereof. Suitable initiators for use in conjunction with the present invention may include, but are not limited to, chemical initiators (e.g., 2,2'-azobis(2-methylpropionamidine) dihydrochloride, sodium persulfate, and the like), physical initiators (e.g., heat, IR radiation, UV radiation, sonic waves, and the like), or any combination thereof. In some embodiments, reactions to form a polymer coating in situ may involve first adsorbing monomers and surfactants to a proppant particle surface and then introducing an initiator. In some embodiments, reactions to form a polymer coating in situ may involve concurrently adding monomers, surfactants, and initiators to a proppant dispersion.

By way of nonlimiting example, some embodiments may involve reacting a first silane with a proppant surface, where the first silane comprises a functional linking group and a silane group, and then reacting a second silane with the first silane so as to form a siloxane bond, where the second silane comprises a hydrophobic aliphatic group and a silane group.

Producing hydrophobic/oleophobic proppant particles of the present invention (e.g., coating proppant particles) may occur at a drill site or off-site. In some embodiments, a hydrophobic/oleophobic proppant particle of the present invention may be formed on-the-fly at a drill site, and optionally formed directly in a treatment fluid.

In some embodiments, a treatment fluid may comprise a base fluid and a hydrophobic/oleophobic proppant particle of the present invention. As used herein, the term "treatment," or "treating," refers to any subterranean operation that uses a fluid in conjunction with a desired function and/or for a desired purpose, e.g., drilling, stimulation, sand control, fracturing, wellbore strengthening, fluid loss control, and completion operations. The term "treatment," or "treating," does not imply any particular action by the fluid.

Suitable base fluids for use in conjunction with the present invention may include, but not be limited to, oil-based fluids, aqueous-based fluids, aqueous-miscible fluids, water-in-oil emulsions, or oil-in-water emulsions. Suitable oil-based fluids may include alkanes, olefins, aromatic organic compounds, cyclic alkanes, paraffins, diesel fluids, mineral oils, desulfurized hydrogenated kerosenes, and any combination thereof. Suitable aqueous-based fluids may include fresh water, saltwater (e.g., water containing one or more salts dissolved therein), brine (e.g., saturated salt water), seawater, and any combination thereof. Suitable aqueous-miscible fluids may include, but not be limited to, alcohols, e.g., methanol, ethanol, n-propanol, isopropanol, n-butanol, sec-butanol, isobutanol, and t-butanol; glycerins; glycols, e.g., polyglycols, propylene glycol, and ethylene glycol; polyglycol amines; polyols; any derivative thereof; any in combination with salts, e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate; any in combination with an aqueous-based fluid; and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. Examples of suitable invert emulsions include those disclosed in U.S. Pat. No. 5,905,061 entitled "Invert Emulsion Fluids Suitable for Drilling," U.S. Pat. No. 5,977,031 entitled "Ester Based Invert Emulsion Drilling Fluids and Muds Having Negative Alkalinity," U.S. Pat. No. 6,828,279 entitled "Biodegradable Surfactant for Invert Emulsion Drilling Fluid," U.S. Pat. No. 7,534,745 entitled "Gelled Invert Emulsion Compositions Comprising Polyvalent Metal Salts of an Organophosphonic Acid Ester or an Organophosphinic Acid and Methods of Used and Manufacture," U.S. Pat. No. 7,645,723 entitled "Method of Drilling Using Invert Emulsion Drilling Fluids," and U.S. Pat. No. 7,696,131 "Diesel Oil-Based Invert Emulsion Drilling Fluids and Methods of Drilling Boreholes," each of which are incorporated herein by reference. It should be noted that for water-in-oil and oil-in-water emulsions, any mixture of the above may be used including the water being and/or comprising an aqueous-miscible fluid.

In some embodiments, a treatment fluid may be foamed. In some embodiments, a treatment fluid may comprise a base fluid, a hydrophobic/oleophobic proppant particle of the present invention, a gas, and a foaming agent.

A gas suitable for use in conjunction with the present invention may include, but is not limited to, nitrogen, carbon dioxide, air, methane, helium, argon, and any combination thereof. One skilled in the art, with the benefit of this disclosure, should understand the benefit of each gas. By way of nonlimiting example, carbon dioxide foams may have deeper well capability than nitrogen foams because carbon dioxide emulsions have greater density than nitrogen gas foams so that the surface pumping pressure required to reach a corresponding depth is lower with carbon dioxide than with nitrogen. Moreover, the higher density may impart greater proppant transport capability, up to about 12 lb of proppant per gal of fracture fluid.

In some embodiments, the quality of a foamed treatment fluid may range from a lower limit of about 5%, 10%, 25%, 40%, 50%, 60%, or 70% gas volume to an upper limit of about 95%, 90%, 80%, 75%, 60%, or 50% gas volume, and wherein the quality of the foamed treatment fluid may range from any lower limit to any upper limit and encompass any subset therebetween. Most preferably, the foamed treatment fluid may have a foam quality from about 85% to about 95%, or about 90% to about 95%.

Suitable foaming agents for use in conjunction with the present invention may include, but are not limited to, cationic foaming agents, anionic foaming agents, amphoteric foaming agents, nonionic foaming agents, or any combination thereof. Nonlimiting examples of suitable foaming agents may include, but are not limited to, surfactants like betaines, sulfated or sulfonated alkoxylates, alkyl quaternary amines, alkoxylated linear alcohols, alkyl sulfonates, alkyl aryl sulfonates, $C_{10}$-$C_{20}$ alkyldiphenyl ether sulfonates, polyethylene glycols, ethers of alkylated phenol, sodium dodecylsulfate, alpha olefin sulfonates such as sodium dodecane sulfonate, trimethyl hexadecyl ammonium bromide, and the like, any derivative thereof, or any combination thereof. Foaming agents may be included in foamed treatment fluids at concentrations ranging typically from about 0.05% to about 2% of the liquid component by weight (e.g., from about 0.5 to about 20 gallons per 1000 gallons of liquid).

Proppant particulates suitable for use in conjunction with the present invention may comprise any material suitable for use in subterranean operations. Suitable materials for these proppant particulates include, but are not limited to, sand, bauxite, ceramic materials, glass materials, polymer materials, polytetrafluoroethylene materials, nut shell pieces, cured resinous particulates comprising nut shell pieces, seed shell pieces, cured resinous particulates comprising seed shell pieces, fruit pit pieces, cured resinous particulates comprising fruit pit pieces, wood, composite particulates, and combinations thereof. Suitable composite particulates may comprise a binder and a filler material wherein suitable filler materials include silica, alumina, fumed carbon, carbon black, graphite, mica, titanium dioxide, barite, meta-silicate, calcium silicate, kaolin, talc, zirconia, boron, fly ash, hollow glass microspheres, solid glass, and combinations thereof. Suitable proppant particles for use in conjunction with the present invention may be any known shape of material, including substantially spherical materials, fibrous materials, polygonal materials (such as cubic materials), and combinations thereof. Moreover, fibrous materials, that may or may not be used to bear the pressure of a closed fracture, may be included in certain embodiments of the present invention.

In some embodiments, hydrophobic/oleophobic proppant particles may be present in a treatment fluid in an amount in the range of from about 0.1 pounds per gallon ("ppg") to about 30 ppg by volume of the treatment fluid.

In some embodiments, a treatment fluid may further comprise at least one additive. Suitable additives for use in conjunction with the present invention may include, but are not limited to, salts, weighting agents, inert solids, fluid loss control agents, emulsifiers, dispersion aids, corrosion inhibitors, emulsion thinners, emulsion thickeners, viscosifying agents, surfactants, particulates, lost circulation materials, foaming agents, gases, pH control additives, breakers, biocides, crosslinkers, stabilizers, chelating agents, scale inhibitors, mutual solvents, oxidizers, reducers, friction reducers, clay stabilizing agents, and any combination thereof.

Some embodiments of the present invention may involve introducing a treatment fluid into at least a portion of the subterranean formation, where the treatment fluid comprises a base fluid and a hydrophobic/oleophobic proppant particle. Suitable treatment fluids for use in conjunction with introducing a hydrophobic/oleophobic proppant particle of the present invention into a subterranean formation may include, but are not limited to, high-rate water pack fluids, frac packing fluids (e.g., a proppant slurry), fracturing completion fluids, gravel packing fluids, and the like. As used herein, the term "high-rate water pack" ("HRWP") refers to an operation in which particulates are injected into a cased and perforated wellbore at a rate and/or pressure that is at or near the fracture rate and/or pressure of the reservoir.

In some embodiments where a high-rate water pack is employed, the aqueous base fluid may be characterized as a low viscosity carrier fluid. The term "low-viscosity carrier fluid," as used herein, refers to a fluid having a viscosity of less than about 20 cp, preferably less than about 10 cp. By way of example, a solution of 10 pounds of guar in 1000 gallons of water solution is a typical low-viscosity carrier fluid. Some embodiments of the present invention may involve introducing a high-rate water pack fluid comprising a low viscosity carrier and a plurality of hydrophobic/oleophobic proppant particles into a subterranean formation so as to form a proppant pack in at least a portion of the subterranean formation.

Some embodiments of the present invention may involve introducing a first treatment fluid (e.g., a pad fluid) into at least a portion of the subterranean formation at a pressure sufficient to create or extend at least one fracture, and then introducing a second treatment fluid (e.g., a proppant slurry fluid) into the subterranean formation, where the second treatment fluid comprises a base fluid and a hydrophobic/oleophobic proppant particle.

In some embodiments, hydrophobic/oleophobic proppant particles may be used as hydrophobic/oleophobic gravel particles for producing a gravel pack. Some embodiments of the present invention may involve introducing a treatment fluid comprising a base fluid and a plurality of hydrophobic/oleophobic gravel particles into a wellbore, and placing the hydrophobic/oleophobic gravel particles in an annulus between a screen and the wellbore so as to form a gravel pack.

In some embodiments, hydrophobic/oleophobic proppant particles may be used in conjunction with injection wells and/or production wells. That is, high-rate water pack fluids, frac packing fluids (e.g., a proppant slurry), fracturing completion fluids, gravel packing fluids, and the like introduced into subterranean formation may be via a wellbore of an injection well or a wellbore of a production well.

After introducing hydrophobic/oleophobic proppant particles into at least a portion of the subterranean formation via an injection wellbore and/or production wellbore, some embodiments may involve subsequent treatments to the subterranean formation. Suitable subsequent treatment operations may include, but are not limited to, lost circulation operations, stimulation operations, acidizing operations, scale inhibiting operations, water-blocking operations, clay stabilizer operations, wellbore strengthening operations, sag control operations, production operations (e.g., producing hydrocarbons from the wellbore), or any combination thereof. After introducing hydrophobic/oleophobic proppant particles into at least a portion of the subterranean formation via an injection wellbore, some embodiments may involve introducing subsequent fluids (e.g., water, steam, $CO_2$, and the like) into the subterranean formation so as to influence production at a proximal production well. The methods and compositions of the present invention may be used in full-scale operations or pills. As used herein, a "pill" is a type of relatively small volume of specially prepared treatment fluid placed or circulated in the wellbore.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
   treating at least a portion of a subterranean formation with
      a treatment fluid comprising:
      a base fluid; and
      a hydrophobic/oleophobic proppant particle having a surface that is both hydrophobic and oleophobic, wherein the hydrophobic/oleophobic proppant particle comprises an at least partial coating that comprises at least one monomeric unit selected from the group consisting of a fluoroalkyl epoxy monomer, a perfluoroalkyl epoxy monomer, a vinylidene fluoride, chlorotrifluoroethylene, a mono-substituted oxetane monomer having at least one fluorinated alkoxymethylene side-chain, and any combination thereof, where an alkyl group of the monomeric unit may range from about $C_3$ to about $C_{12}$.

2. The method of claim 1, wherein the at least partial coating further comprises at least one monomeric unit selected from the group consisting of ethylene, propylene, acrylate, methacrylate, a silane, an organosilane, a siloxane, and a organosiloxane.

3. The method of claim 1, wherein the base fluid is selected from the group consisting of an oil-based fluid, an aqueous-based fluid, an aqueous-miscible fluid, a water-in-oil emulsion, and an oil-in-water emulsion.

4. The method of claim 1, wherein hydrophobic/oleophobic proppant particle is present in the treatment fluid at about 0.1 ppg to about 30 ppg by volume of the treatment fluid.

5. The method of claim 1, wherein treating involves introducing the hydrophobic/oleophobic proppant particle into the subterranean formation via a production wellbore.

6. The method of claim 1 further comprising:
producing hydrocarbons from the subterranean formation.

7. The method of claim 1, wherein treating involves forming at least one selected from the group consisting of a proppant pack comprising the hydrophobic/oleophobic proppant particle, a high-rate water proppant pack comprising the hydrophobic/oleophobic proppant particle, and a gravel pack comprising the hydrophobic/oleophobic proppant particle.

8. The method of claim 1, wherein treating involves introducing the hydrophobic/oleophobic proppant particle into the subterranean formation via an injection wellbore.

9. The method of claim 1 further comprising:
injecting a fluid into the portion of the subterranean formation so as to influence hydrocarbon production at a proximal production well.

10. A method comprising:
introducing a pad fluid into at least a portion of a subterranean formation at a pressure sufficient to create or extend at least one fracture in the subterranean formation; and
introducing a proppant slurry fluid into the subterranean formation, the proppant slurry fluid comprising a base fluid and a hydrophobic/oleophobic proppant particle, wherein the hydrophobic/oleophobic proppant particle comprises an at least partial coating that comprises at least one monomeric unit selected from the group consisting of a fluoroalkyl epoxy monomer, a perfluoroalkyl epoxy monomer, a vinylidene fluoride, chlorotrifluoroethylene, a mono-substituted oxetane monomer having at least one fluorinated alkoxymethylene side-chain, and any combination thereof, where an alkyl group of the monomeric unit may range from about $C_3$ to about $C_{12}$.

11. The method of claim 10, wherein the at least partial coating further comprises at least one monomeric unit selected from the group consisting of ethylene, propylene, acrylate, methacrylate, a silane, an organosilane, a siloxane, and a organosiloxane.

12. The method of claim 10, wherein hydrophobic/oleophobic proppant particle is present in the treatment fluid at about 0.1 ppg to about 30 ppg by volume of the treatment fluid.

13. The method of claim 10 further comprising:
producing hydrocarbons from the subterranean formation.

14. A method comprising:
treating a proppant at a well site so as to yield a hydrophobic/oleophobic proppant particle having a surface that is both hydrophobic and oleophobic, wherein the hydrophobic/oleophobic proppant particle comprises an at least partial coating that comprises at least one monomeric unit selected from the group consisting of a fluoroalkyl epoxy monomer, a perfluoroalkyl epoxy monomer, a vinylidene fluoride, chlorotrifluoroethylene, a mono-substituted oxetane monomer having at least one fluorinated alkoxymethylene side-chain, and any combination thereof, where an alkyl group of the monomeric unit may range from about $C_3$ to about $C_{12}$; and
introducing the hydrophobic/oleophobic proppant particle into at least a portion of a subterranean formation.

* * * * *